UNITED STATES PATENT OFFICE.

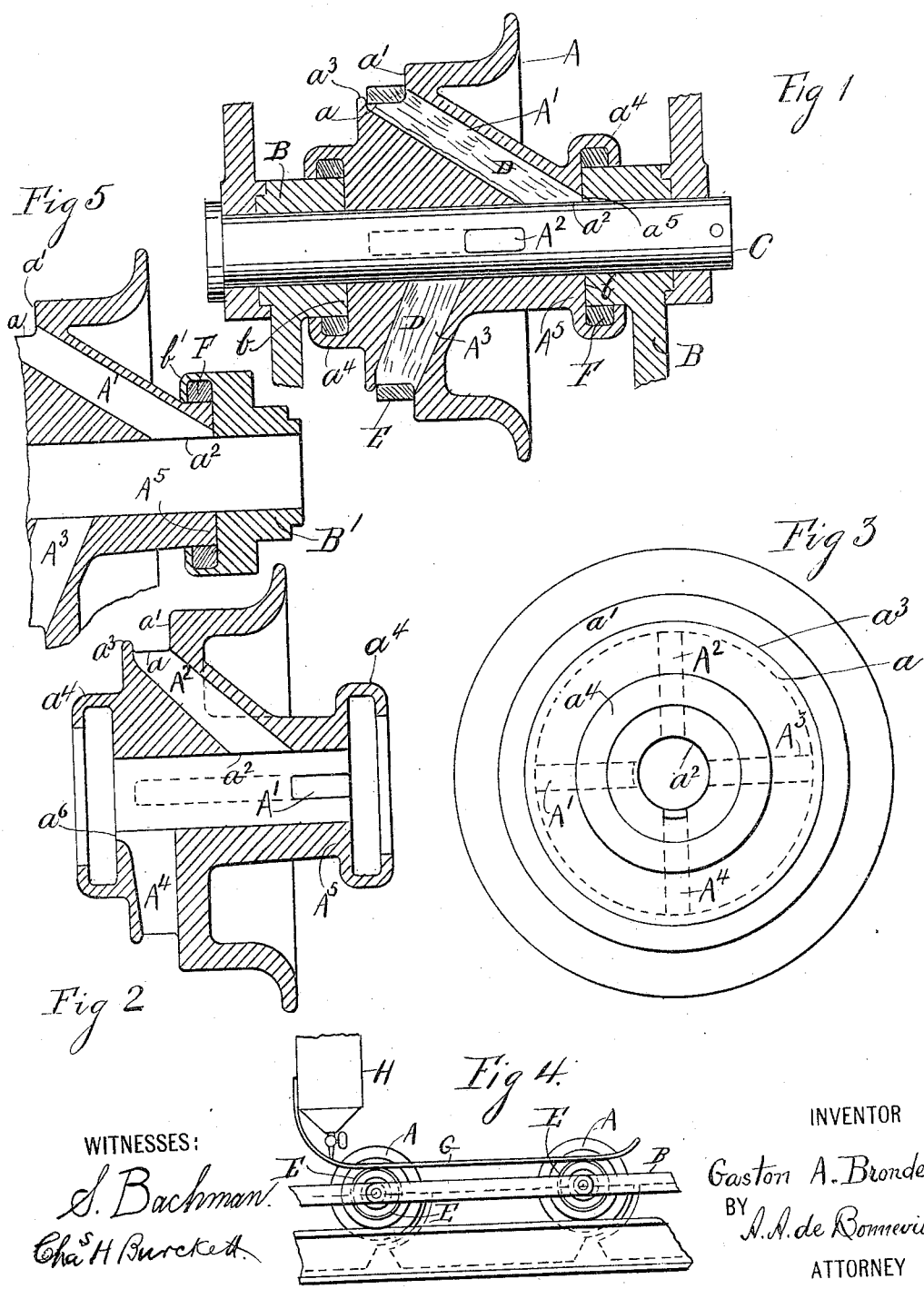

GASTON A. BRONDER, OF BROOKLYN, NEW YORK.

LUBRICATING DEVICE FOR WHEELS AND AXLES.

No. 812,402.

Specification of Letters Patent.

Patented Feb. 13, 1906.

Application filed April 29, 1903. Serial No. 154,765.

*To all whom it may concern:*

Be it known that I, GASTON A. BRONDER, a citizen of the United States of America, and a resident of the borough of Brooklyn, county of Kings, State of New York, have invented certain new and useful Improvements in Lubricating Devices for Wheels and Axles, of which the following is a specification.

This invention relates to means for lubricating the bearing-surfaces of wheels turning on axles. Its object is the production of wheels in which the lubrication of the whole of their bearing-surfaces is secured and in which said surfaces are maintained dust-proof.

Referring to the accompanying drawings, Figure 1 represents a vertical axial section of my wheel with its axle applied to the links of a conveyer. Fig. 2 shows a vertical axial section of the wheel turned ninety degrees from the position shown in Fig. 1. Fig. 3 is an end view of Fig. 2. Fig. 4 represents a pair of my wheels on a conveyer and a wiper connected therewith. Fig. 5 shows a partial axial section of a modification of the wheel.

The wheel is shown at A, having receptacles or ducts $A'$ $A^2$ $A^3$ $A^4$ extending from the bearing-surface $a^2$ to the outer circumferential portion $a$, adjacent to the rear face $a'$ of the wheel. The ducts diverge radially from the bearing-surface, each one making an angle of ninety degrees with the one next adjacent in planes of right angles to the longitudinal axis of said surface and advancing on the line of said axis, so that the intersection of one duct with the said bearing-surface shall be adjacent or approximately adjacent to the intersection of the one next adjacent. The outer ends of the ducts all lie in the same outer circumferential portion $a$ and from thence incline toward the bearing-surface $a^2$, so that the combined intersections of the ducts with the bearing-surface cover the total length thereof spirally or helically around the same. On the end of the hub $A^5$ and from the opposite end of the wheel there are formed annular projecting hoods or covers $a^4$, into which the ends $b$ of the links B and the like, supported on the axle C, fit. The ducts may be made with parallel walls, as shown at $A^7$, and they may taper from the bearing-surface outwardly and are generally formed so as to intersect a portion of the end faces of the hubs, as shown at $a^5$ $a^6$. Wicks D are forced into the ducts, and a wick E is generally wrapped around the portion $a$ covering the ends of the wicks D, a collar or bead $a^3$ on the wheel holding the wick E in place. Under the hoods $a^4$ are placed wicks F.

It will be noted that oil can reach the whole length of the bearing-surface $a^2$ by way of the wicks D and that only small portions of the said bearing-surface of the wheel are cut away by virtue of the ducts.

In Fig. 4 I have shown my invention applied to a couple of wheels A, with a wiper G bearing on the wicks E. A reservoir H is arranged to furnish a lubricant to the wiper, which latter conveys it to the wicks.

In Fig. 5, which shows a modification of my invention, hoods are not formed on the ends of the hub of the wheel; but a link $B'$, with a hood $b'$, extends over the end of the boss of the wheel, as $A^5$, and wick F is placed in the hood $b'$.

Having described my invention, I claim—

1. The combination of an axle, a wheel thereon having ducts leading from an outer circumferential portion thereof to the bearing-surface on the axle, and extending from end to end of said surface and helically around the same, the ducts tapering from the bearing-surface to the said outer portions of the wheel, there being hoods extending from the hubs of the wheel, and wicks in the ducts and hoods.

2. The combination of an axle, a wheel thereon having ducts leading from an outer circumferential portion thereof to the bearing-surface on the axle, and extending from end to end of said surface and helically around the same, the ducts tapering from the bearing-surface to the said outer portion, hoods extending from the hubs of the wheel, wicks in the ducts and hoods, a wick wrapped around the wheel covering the wicks in the ducts, a wiper bearing against the wrapped wick, and an oil-reservoir for the wiper.

Signed at New York, county and State of New York, this 25th day of April, 1903.

GASTON A. BRONDER.

Witnesses:
 CHAS. H. BURCKETT,
 SAMUEL BACHMAN.